United States Patent Office.

EBEN N. HORSFORD, OF CAMBRIDGE, MASSACHUSETTS.

*Letters Patent No. 75,271, dated March 10, 1868*

IMPROVED PREPARATION OF ACID PHOSPHATE OF LIME.

*The Schedule referred to in these Letters Patent and making part of the same.*

TO ALL WHOM IT MAY CONCERN:

Be it known that I, EBEN N. HORSFORD, of the city of Cambridge, in the county of Middlesex, and State of Massachusetts, have invented a new and useful Improvement in the Preparation of Acid Phosphate of Lime; and I do hereby declare that the following is a full and exact description thereof.

The object of this invention is to obtain an acid phosphate of lime, which may be easily handled in pulverulent form, and which may readily be obtained in liquid condition comparatively pure, when wanted. It consists in adding sulphuric acid to a solution of acid phosphate of lime in a solution of a salt of lime, the acid of which salt is volatile, by which the lime, in combination with the volatile acid, is combined with the sulphuric acid, and for the most part precipitated as hydrated sulphate of lime, and then driving off the volatile acid by heat, leaving behind acid phosphate of lime mixed with or feebly combined with the sulphate of lime, from which it may be separated in comparative purity by leaching.

The mode of manufacture is as follows: I dissolve to saturation common tribasic phosphate of lime, derived from bones or mineral phosphate of lime, in nitric acid of specific gravity 1.23, requiring two of nitric acid by weight to three of phosphate of lime, which gives a result of nitrate of lime and monobasic phosphate of lime, as expressed in the following formula: $3 \text{ Cal. Po}_5 + 2 [\text{Ho. no}_5] = \text{Cal. 2 Ho. Po}_5 + 2 [\text{Cal. no}_5.]$ If the phosphate of lime contain impurities, or the nitric acid be of other strength, a corresponding modification of the proportions must be made. To this solution I add two parts, by weight, of oil of vitriol, $[\text{Ho. So}_3,]$ diluted with water to precipitate any sulphate of lead that may be present, and then siphoned off from the precipitate. This sulphuric acid combines with the lime of the nitrate of lime, forming a precipitate of sulphate of lime, and leaving, besides a trace of the sulphate of lime, monobasic phosphate of lime, and nitric acid in solution, thus: $\text{Cal. 2 Ho. Po}_5 + 2 [\text{Cal. no}_5] + 2 [\text{Ho. So}_3] + 4 \text{Ho} = 2 [\text{Cal. So}_3, 2 \text{Ho.}] + 2 [\text{Ho. no}_5] + \text{Cal. Ho. Po}_5.$ I then drive off the nitric acid by gentle heat, adding toward the close a small quantity of water to facilitate the escape of the last traces of nitric acid. A current of warm air over the surface of the drying mass facilitates the removal of the water and volatile acid.

I sometimes save the nitric acid by conducting the vapors into a suitable condenser. I sometimes add, after the volatile acid has all been expelled, a little lime-solution, and dry off the water to correct any accidental excess of sulphuric acid, and to render the preparation more readily pulverulent, and more thoroughly non-hygroscopic. I sometimes replace a part or the whole of the nitric acid with hydrochloric acid.

This preparation furnishes acid phosphate of lime in superior condition for medicinal and culinary purposes. Where the gypsum is not objectionable, the preparation may be employed as it is. Where the acid phosphate of lime alone is required, it may be separated by solution in water, and leaching. The mixture, being of definite composition, it may be weighed or measured as a powder, and then leached to get the acid phosphate of lime. When employed as a substitute for tartaric acid, in making bread and biscuit, &c., the proportion should be about two of the powder to one of bicarbonate of soda.

What I claim, and desire to secure by Letters Patent of the United States, is—

1. The method of producing a pulverulent acid phosphate of lime, substantially as and for the purposes above set forth.

2. The product obtained by the process, substantially as and for the purposes above described.

E. N. HORSFORD.

Witnesses:
A. POLLOK,
EDM. F. BROWN.